United States Patent
Jeong

(10) Patent No.: US 10,580,400 B2
(45) Date of Patent: Mar. 3, 2020

(54) METHOD FOR CONTROLLING ARTIFICIAL INTELLIGENCE SYSTEM THAT PERFORMS MULTILINGUAL PROCESSING

(71) Applicant: LG ELECTRONICS INC., Seoul (KR)

(72) Inventor: Gyuhyeok Jeong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 81 days.

(21) Appl. No.: 15/891,625

(22) Filed: Feb. 8, 2018

(65) Prior Publication Data
US 2018/0240456 A1 Aug. 23, 2018

(30) Foreign Application Priority Data
Feb. 20, 2017 (KR) .................. 10-2017-0022530

(51) Int. Cl.
| | | |
|---|---|---|
| *G10L 15/00* | (2013.01) | |
| *G10L 15/187* | (2013.01) | |
| *G10L 15/22* | (2006.01) | |
| *G10L 15/30* | (2013.01) | |
| G10L 15/02 | (2006.01) | |

(52) U.S. Cl.
CPC .......... *G10L 15/005* (2013.01); *G10L 15/187* (2013.01); *G10L 15/22* (2013.01); *G10L 15/30* (2013.01); G10L 2015/025 (2013.01)

(58) Field of Classification Search
USPC ................... 704/231–257, 270–275
See application file for complete search history.

(56) References Cited

U.S. PATENT DOCUMENTS

| | | | | |
|---|---|---|---|---|
| 2003/0009517 | A1* | 1/2003 | Wang .................... | G06F 17/218 709/203 |
| 2005/0010422 | A1* | 1/2005 | Ikeda .................... | G10L 15/30 704/277 |
| 2005/0165598 | A1* | 7/2005 | Cote .................... | G10L 15/183 704/1 |
| 2008/0221862 | A1* | 9/2008 | Guo .................... | G06F 17/289 704/2 |

(Continued)

FOREIGN PATENT DOCUMENTS

KR    1020170000722    1/2017

OTHER PUBLICATIONS

European Patent Office Application Serial No. 18156438.6, Search Report dated Aug. 1, 2018, 21 pages.

(Continued)

*Primary Examiner* — Jesse S Pullias
(74) *Attorney, Agent, or Firm* — Lee, Hong, Degerman, Kang & Waimey PC

(57) ABSTRACT

This specification relates to a method for controlling an artificial intelligence system which performs a multilingual processing based on artificial intelligence technology. The method for controlling an artificial intelligence system which performs a multilingual processing includes: receiving voice information through a microphone; determining a language of the voice information, based on a preset reference; selecting a specific voice recognition server from a plurality of voice recognition servers which process different languages, based on a result of the determination; and transmitting the voice information to the selected specific voice recognition server.

24 Claims, 5 Drawing Sheets

(56) References Cited

U.S. PATENT DOCUMENTS

2011/0035219 A1 2/2011 Kadirkamanathan et al.
2012/0166176 A1* 6/2012 Nakamura ............ G06F 17/289
 704/7
2014/0163977 A1* 6/2014 Hoffmeister ............ G10L 15/32
 704/232

OTHER PUBLICATIONS

Gonzalez-Dominguez, J. et al., "A Real-Time End-to-End Multilingual Speech Recognition Architecture", IEEE Journal of Selected Topics in Signal Processing, vol. 9, No. 4, Jun. 2015, XP011581056, 12 pages.

* cited by examiner

METHOD FOR CONTROLLING ARTIFICIAL INTELLIGENCE SYSTEM THAT PERFORMS MULTILINGUAL PROCESSING

CROSS-REFERENCE TO RELATED APPLICATION

Pursuant to 35 U.S.C. § 119(a), this application claims the benefit of earlier filing date and right of priority to Korean Patent Application No. 10-2017-0022530, filed on Feb. 20, 2017, the contents of which are hereby incorporated by reference herein in its entirety.

BACKGROUND OF THE INVENTION

1. Field of the Invention

This specification relates to a method for controlling an artificial intelligence system which performs a multilingual processing based on artificial intelligence technology.

2. Background of the Invention

Artificial intelligence is a field of computer engineering and information technology that researches a method to make computers think, study, self-develop, etc. instead of human intelligence. This means a method to make computers mimic human's intelligent behaviors.

In addition, the artificial intelligence does not exist in itself, but it is directly or indirectly related to other fields of computer science. Especially, nowadays, attempts are actively ongoing to solve problems occurring in many fields of information technology, by introducing the artificial intelligence into the fields of the information technology.

For example, the artificial intelligence has been already applied to a field of a natural language processing, for practical use of a system such as an automatic translation.

Further, various kinds of language commands such as English, Chinese, Korean and Spanish may be inputted to common devices in a place crowded with people using various languages, such as airports and subways.

In the case where various kinds language commands are input, it is technically difficult for a single server to convert all languages into texts and to analyze meanings of the converted languages. For instance, a commercial server substantially uses a different voice recognition/natural language processing model according to each language.

SUMMARY OF THE INVENTION

Therefore, an aspect of the detailed description is to provide a method for controlling an artificial intelligence system which performs a multilingual processing, capable of transmitting voice information to a different server according to a language of inputted voice information, and capable of receiving a processing result.

To achieve these and other advantages and in accordance with the purpose of this specification, as embodied and broadly described herein, there is provided a method for controlling a multilingual audio processing system, the method comprising: receiving voice information via a microphone, determining at least one language of the received voice information based on a preset reference language information, selecting a specific voice recognition server from a plurality of voice recognition servers based on the determined at least one language, wherein the plurality of voice recognition servers correspond to a different languages and the specific voice recognition server corresponds to the at least one determined language; and generating a query comprising the received voice information and transmitting the query to the selected specific voice recognition server.

In an embodiment, the preset reference language information may be stored in a memory at a client of the system, and the client may determine the at least one language of the received voice information to select the specific voice recognition server.

In an embodiment, the method may further comprise separating the voice information into a plurality of phonemes to determine the language of the received voice information.

In an embodiment, the method may further comprise determining a language of each of the plurality of phonemes.

In an embodiment, the plurality of phonemes may be determined to comprise a plurality of languages and the selected specific voice recognition server may be configured to process mixed language voice information.

In an embodiment, the determined at least one language corresponds to a single language, and the selected specific voice recognition server may be configured to process only voice information in the single language.

In an embodiment, the method may further comprise: receiving a response to the generated query from the specific voice recognition server, generating reply information to the received voice information based on the received response and outputting the generated reply in response to the received voice information.

In an embodiment, the outputted generated reply may be in the form of an audio output.

In an embodiment, the audio output of the generated reply may be performed in the determined language of the received voice information.

In an embodiment, the outputted generated reply may be displayed on a display of a client terminal of the system.

In an embodiment, the method may further comprise: storing the received voice information in a memory at a client terminal of the system, receiving another voice information via the microphone, retrieving the stored voice information from the memory, generating a similarity value between the another voice information and the retrieved stored voice information and outputting a reply stored in the memory and associated with the stored voice information when the generated similarity value is equal to or greater than a threshold value.

In an embodiment, when the voice information comprises a plurality of different languages, the generated reply to the voice information may be in one of the plurality of languages determined to be a preferred language.

In an embodiment, the method may further comprise: requesting a language translation with respect to the voice information to the specific voice recognition server for translating the voice information into a second language from a first language, receiving language translation data for the voice information from the specific voice recognition server, generating reply information to the received voice information based on the received language translation data and outputting the generated reply in response to the received voice information.

In an embodiment, the outputted generated reply may be in the form of an audio output.

In an embodiment, the outputted generated reply may be displayed on a display of a client terminal of the system.

Furthermore, there is provided A multilingual audio processing terminal, the terminal comprising: a microphone configured to receive audio information, a transceiver configured to transmit and receive information and a controller configured to: receive voice information via the microphone, determine at least one language of the received voice information based on a preset reference language information, select a specific voice recognition server from a plurality of voice recognition servers based on the determined at least one language, wherein the plurality of voice recognition servers correspond to a different languages and the specific voice recognition server corresponds to the at least one determined language and transmit, via the transceiver, a query comprising the received voice information to the selected specific voice recognition server In an embodiment, the terminal may further comprise a memory, wherein: the preset reference language information is stored in the memory and the controller is further configured to determine the at least one language of the received voice information to select the specific voice recognition server.

In an embodiment, the controller may be further configured to separate the voice information into a plurality of phonemes to determine the language of the received voice information.

In an embodiment, the controller may be further configured to determine a language of each of the plurality of phonemes.

In an embodiment, the plurality of phonemes may be determined to comprise a plurality of languages and the selected specific voice recognition server may be configured to process mixed language voice information.

In an embodiment, the determined at least one language corresponds to a single language, and the selected specific voice recognition server may be configured to process only voice information in the single language.

In an embodiment, the terminal may further comprise an output configured to output information, wherein the controller is further configured to: receive, via the transceiver, a response to the generated query from the specific voice recognition server, generate reply information to the received voice information based on the received response and output, via the output, the generated reply in response to the received voice information.

In an embodiment, the output may comprise a speaker and the outputted generated reply is in the form of an audio output.

In an embodiment, the audio output of the generated reply may be performed in the determined language of the received voice information.

In an embodiment, the output may comprise a display configured to display information and the outputted generated reply is displayed on the display.

In an embodiment, the terminal may further comprise a memory, wherein the controller is further configured to: store the received voice information in the memory, receive another voice information via the microphone, retrieve the stored voice information from the memory, generate a similarity value between the another voice information and the retrieved stored voice information and output, via the output, a reply stored in the memory and associated with the stored voice information when the generated similarity value is equal to or greater than a threshold value.

In an embodiment, when the voice information may comprise a plurality of different languages, the generated reply to the voice information is in one of the plurality of languages determined to be a preferred language.

In an embodiment, the controller may be further configured to: transmit, via the transceiver, a request for language translation with respect to the voice information to the specific voice recognition server for translating the voice information into a second language from a first language, receive, via the transceiver, language translation data for the voice information from the specific voice recognition server, generate reply information to the received voice information based on the received language translation data and output, via the output, the generated reply in response to the received voice information.

In an embodiment, the output may comprise a speaker and the outputted generated reply is in the form of an audio output.

In an embodiment, the output may comprise a display configured to display information and the outputted generated reply is displayed on the display.

The method for controlling an artificial intelligence system which performs a multilingual processing according to the present invention may have the following advantages.

According to at least one of embodiments of the present invention, since voice information is transmitted to a different server according to a type (language type) of an uttered voice, an optimum server may be firstly allocated in a client step. This may allow a rapid/precise service to be provided.

According to another embodiment, a user may select a server which is to perform a language processing by inputting a specific request (language conversion request).

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Figure 1A:
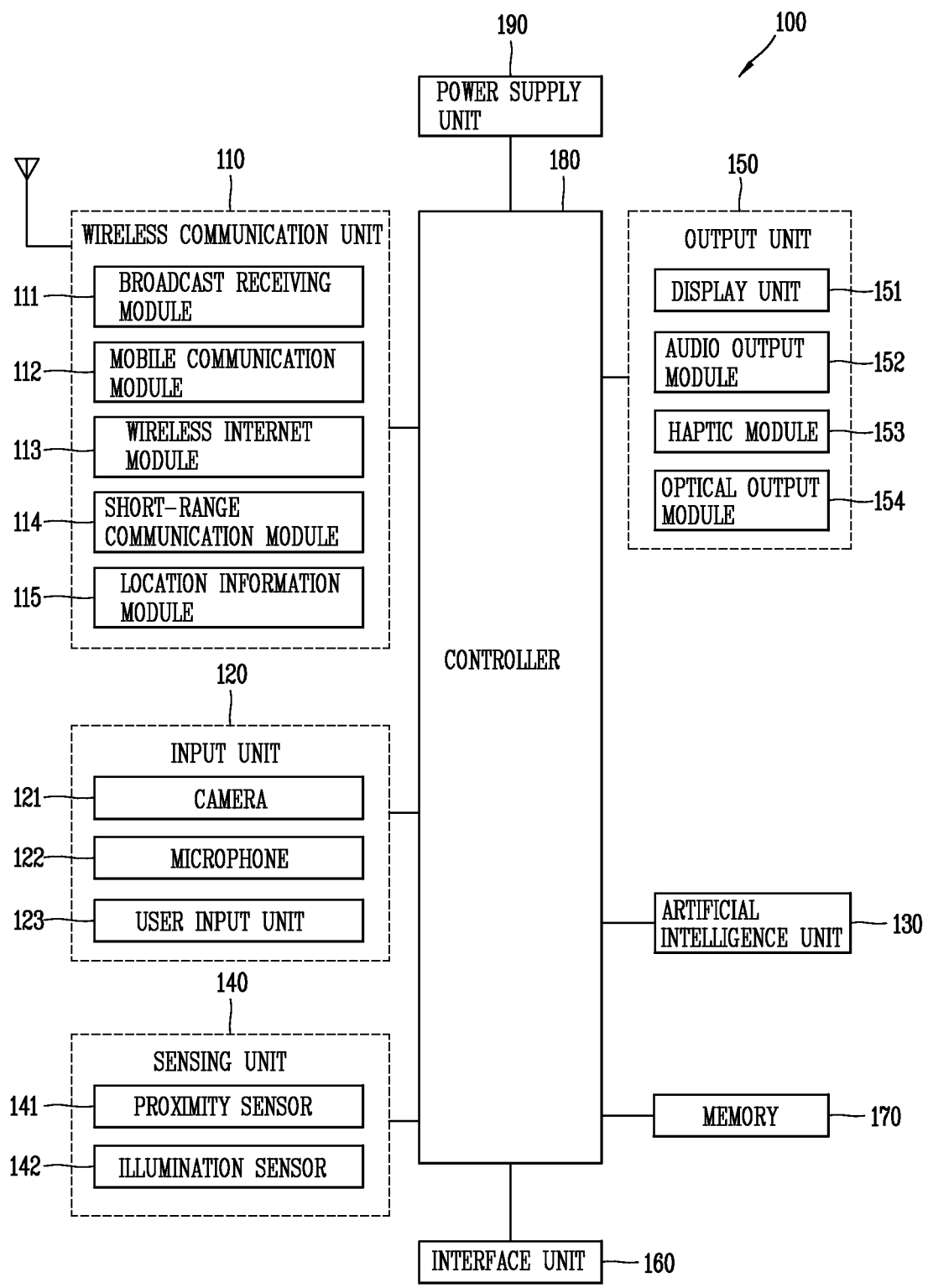
FIG. 1A is a block diagram illustrating a mobile terminal according to the present invention.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of features, numbers, steps, functions, several components, or combinations thereof, disclosed in the specification, and it is also understood that greater or fewer features, numbers, steps, functions, several components, or combinations thereof may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, digital signage, and the like.

Figure 1B:
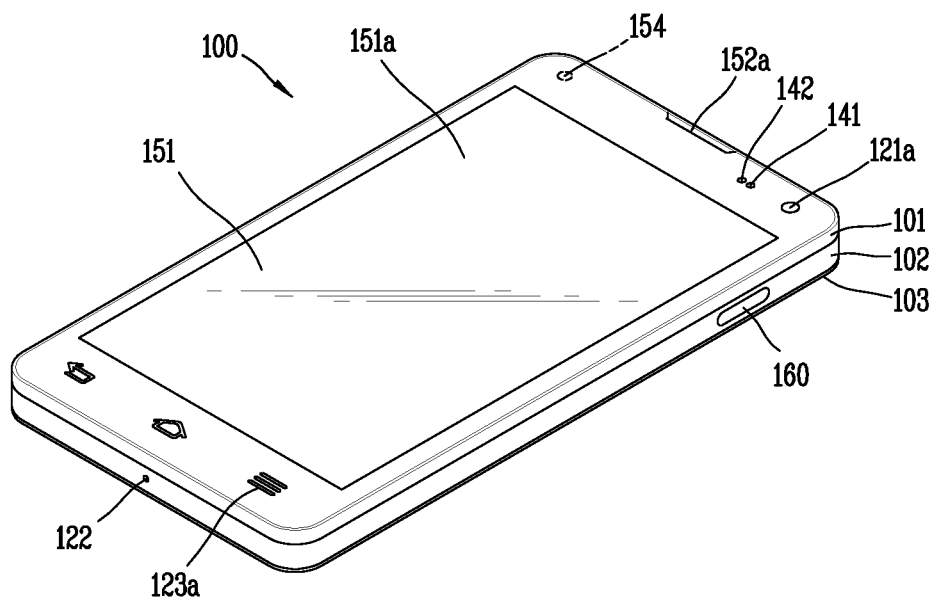
FIGS. 1B and 1C are conceptual views of a mobile terminal according to the present invention, which are viewed from different directions.
Figure 1C:
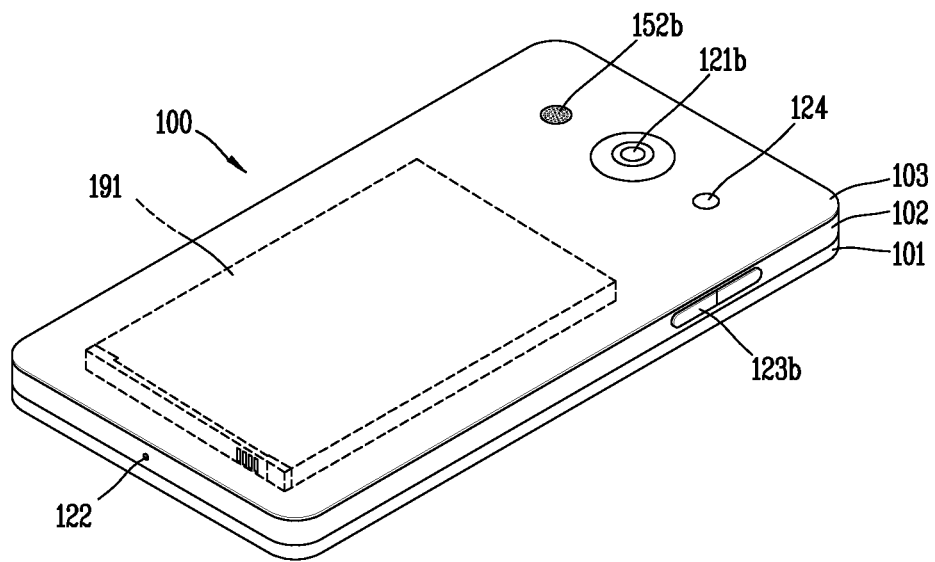

FIG. 1A is a block diagram illustrating a mobile terminal according to the present invention. And FIGS. 1B and 1C are conceptual views of a mobile terminal according to the present invention, which are viewed from different directions.

The mobile terminal 100 may be shown having components such as a wireless communication unit 110, an input unit 120, an artificial intelligence (AI) unit 130, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

In more detail, the wireless communication unit 110 may typically include one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 may typically include one or more modules which connect the mobile terminal 100 to one or more networks.

The wireless communication unit 110 may include one or more of a broadcast receiving module 111, a mobile communication module 112, a wireless Internet module 113, a short-range communication module 114, and a location information module 115.

The input unit 120 may include a camera 121 or an image input unit for obtaining images or video, a microphone 122, which is one type of audio input device for inputting an audio signal, and a user input unit 123 (for example, a touch key, a mechanical key, and the like) for allowing a user to input information. Data (for example, audio, video, image, and the like) may be obtained by the input unit 120 and may be analyzed and processed according to user commands.

The artificial intelligence unit 130 plays a role of processing information based on an artificial intelligence technology and may include at least one module for performing at least one of learning of information, inference of information, perception of information, and processing of a natural language.

The artificial intelligence unit 130 may use a machine learning technology to execute at least one of learning, inference and processing of a large amount of information (big data), such as information stored in the mobile terminal, surrounding environment information related to the mobile terminal, information stored in a communication-available external storage, etc. And the artificial intelligence unit 130 may predict (or infer) at least one executable operation of the mobile terminal based on the information learned using the machine learning technology, and control the mobile terminal to execute the most feasible operation among the at least one predicted operation.

The machine learning technology is a technology that collects and learns a large amount of information based on at least one algorithm, and determines and predicts information based on the learned information. The learning of information is an operation of grasping characteristics of information, rules and judgment criteria, quantifying a relation between information and information, and predicting new data using the quantified patterns.

Algorithms used by the machine learning technology may be algorithms based on statistics, for example, a decision tree that uses a tree structure type as a prediction model, an artificial neural network that mimics neural network structures and functions of living creatures, genetic programming based on biological evolutionary algorithms, clustering of distributing observed examples to a subset of clusters, a Monte Carlo method of computing function values as probability using randomly-extracted random numbers, and the like.

As one field of the machine learning technology, deep learning is a technology of performing at least one of learning, determining, and processing information using the artificial neural network algorithm. The artificial neural network may have a structure of linking layers and transferring data between the layers. This deep learning technology may be employed to learn vast amounts of information through the artificial neural network using a graphic processing unit (GPU) optimized for parallel computing.

Meanwhile, the artificial intelligence unit 130 may collect (sense, monitor, extract, detect, receive) signals, data and information input or output among components of the mobile terminal, in order to collect vast amounts of information for applying the machine learning technology. Also, the artificial intelligence unit 130 may collect (sense, monitor, extract, detect, receive) data, information and the like stored in an external storage (for example, a cloud server) connected through communication. More specifically, the collection of information may be understood as a term including an operation of sensing information through a sensor, extracting information stored in the memory 170, or receiving information from an external storage through communication.

The artificial intelligence unit 130 may sense information within the mobile terminal, surrounding environment information related to the mobile terminal, and user information through the sensing unit 140. In addition, the artificial intelligence unit 130 may receive broadcast signals and/or broadcast-related information, wireless signals, wireless data, and the like through the wireless communication unit 110. The artificial intelligence unit 130 may also receive image information (or signal), audio information (or signal), data, or user-input information from an input unit.

The artificial intelligence unit 130 may collect vast amounts of information in real time in a background, learn the collected information, process the learned information into an appropriate form of information (for example, knowledge graph, command policy, personalization database, dialog engine, etc.), and store the processed information in the memory 170.

When the operation of the mobile terminal is predicted based on the information learned using the machine learning technology, the artificial intelligence unit 130 may control the components of the mobile terminal to execute the predicted operation or transfer a control command for executing the predicted operation to the controller 180. The controller 180 may then execute the predicted operation by controlling the mobile terminal based on the control command.

Meanwhile, when a specific operation is executed, the artificial intelligence unit 130 may analyze history information indicating the execution of the specific operation through the machine learning technology and execute updating of previously-learned information based on the analyzed information. Accordingly, the artificial intelligence unit 130 can improve accuracy of such information prediction.

Meanwhile, in this specification, the artificial intelligence unit 130 and the controller 180 may be understood as the same component. In this instance, functions executed in the controller 180 described herein may be expressed as being executed in the artificial intelligence unit 130, and the controller 180 may be named as the artificial intelligence unit 130, or conversely the artificial intelligence unit 130 may be referred to as the controller 180.

On the other hand, in this specification, the artificial intelligence unit 130 and the controller 180 may be understood as separate components. In this instance, the artificial intelligence unit 130 and the controller 180 may execute various controls on the mobile terminal through data exchange with each other. The controller 180 may execute at least one function on the mobile terminal or control at least one of the components of the mobile terminal based on results derived from the artificial intelligence unit 130. Furthermore, the artificial intelligence unit 130 may also be operated under the control of the controller 180.

The sensing unit 140 may typically be implemented using one or more sensors configured to sense internal information of the mobile terminal, the surrounding environment of the mobile terminal, user information, and the like. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The mobile terminal disclosed herein may be configured to utilize information obtained from one or more sensors of the sensing unit 140, and combinations thereof.

The output unit 150 may typically be configured to output various types of information, such as audio, video, tactile output, and the like. The output unit 150 may be shown having at least one of a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions. The memory 170 may be configured to store application programs or applications executed in the mobile terminal 100, data or instructions for operations of the mobile terminal 100, and data (for example, at least one algorithm information for machine learning, etc.) for operations of the artificial intelligence unit 130. Some of these application programs may be downloaded from an external server via wireless communication. Other application programs may be installed within the mobile terminal 100 at time of manufacturing or shipping (for example, receiving a call, placing a call, receiving a message, sending a message, and the like). Meanwhile, the application programs may be stored in the memory 170 and installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the aforementioned various components, or activating application programs stored in the memory 170.

Also, the controller 180 controls some or all of the components illustrated in FIG. 1A in order to execute an application program that have been stored in the memory 170. In addition, the controller 180 may control at least two of those components included in the mobile terminal to activate the application program.

The power supply unit 190 is configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least part of the components may cooperatively operate to implement an operation, a control or a control method of a mobile terminal according to various embodiments disclosed herein. Also, the operation, the control or the control method of the mobile terminal may be implemented on the mobile terminal by an activation of at least one application program stored in the memory 170.

Hereinafter, description will be given in more detail of the aforementioned components with reference to FIG. 1A, prior to describing various embodiments implemented through the mobile terminal 100.

First, regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

Here, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position (or current position) of the mobile terminal. As an example, the location information module 115 includes a Global Position System (GPS) module, a Wi-Fi module, or both. For example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module. If desired, the location information module 115 may alternatively or additionally function with any of the other modules of the wireless communication unit 110 to obtain data related to the position of the mobile terminal. The location information module 115 is a module used for acquiring the position (or the current position) and may not be limited to a module for directly calculating or acquiring the position of the mobile terminal.

The input unit 120 may be configured to permit various types of inputs (information or signals) to the mobile terminal 100. Examples of such inputs include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. Meanwhile, the cameras 121 may be arranged in a matrix configuration to permit a plurality of images having various angles or focal points to be input to the mobile terminal 100. Also, the cameras 121 may be located in a stereoscopic arrangement to acquire left and right images for implementing a stereoscopic image.

The microphone 122 processes an external audio signal into electric audio (sound) data. The processed audio data can be used in various manners according to a function (or an application program) being executed in the mobile terminal 100. If desired, the microphone 122 may include assorted noise removing algorithms to remove unwanted noise generated in the course of receiving the external audio signal.

The user input unit 123 is a component that permits input by a user. Such user input may enable the controller 180 to control operation of the mobile terminal 100 when information is input through the user input unit 123. The user input unit 123 may include one or more of a mechanical input element (for example, a mechanical key, a button located on a front and/or rear surface or a side surface of the mobile terminal 100, a dome switch, a jog wheel, a jog switch, and the like), or a touch-sensitive input element, among others. As one example, the touch-sensitive input element may be a virtual key, a soft key or a visual key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like, and generate a corresponding sensing signal. The controller 180 generally cooperates with the sending unit 140 to control operation of the mobile terminal 100 or execute data processing, a function or an operation associated with an application program installed in the mobile terminal based on the sensing signal. The sensing unit 140 may be implemented using any of a variety of sensors, some of which will now be described in more detail.

The proximity sensor 141 refers to a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data (or information) according to whether a touch with respect to a point on the touch screen is either a proximity touch or a contact touch.

A touch sensor can sense a touch (or a touch input) applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched region, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

Meanwhile, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121, which has been depicted as a component of the input unit 120, typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

Also, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a flash memory type, a hard disk type, a solid state disk (SSD) type, a silicon disk drive (SDD) type, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control operations relating to application programs and the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provides internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a receiver which transmits a call sound to a user's ears, and the second audio output module 152b may be implemented in the form of a loud speaker to output alarm sounds or multimedia reproduction sounds.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

A flash 124 is shown adjacent to the second camera 121b. When an image of a subject is captured with the camera 121b, the flash 124 may illuminate the subject.

The second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 (refer to FIG. 1A) may be retractable into the terminal body. Alternatively, an antenna may be formed using a film attached to an inner surface of the rear cover 103, or a case that includes a conductive material.

A power supply unit 190 for supplying power to the mobile terminal 100 (refer to FIG. 1A) may include a battery 191, which is mounted in the terminal body or detachably coupled to an outside of the terminal body.

The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

The present invention provides a method for controlling an artificial intelligence system which has the aforementioned mobile terminal as a component. The artificial intelligence system will be explained in more detail before explaining the present invention.

The artificial intelligence system means an autonomous system which performs a task instead of a user, for a specific purpose. The artificial intelligence system may largely have two components. More specifically, the artificial intelligence system includes a client configured to perform an interaction with a user, and a server configured to receive a user's command from the client and to perform a function corresponding to the user's command.

Since the client serves to intermediate between the user and the server, the client should be provided with an input unit and an output unit for interaction with the user, and should be provided with a wireless communication device for interaction with the server. The aforementioned mobile terminal is provided with an input unit (a microphone, a touch screen, etc.) and an output unit (a speaker, a touch screen, etc.), and is provided with a wireless communication unit. Thus, the mobile terminal may serve as the client. In this specification, it is assumed that the aforementioned mobile terminal serves as the client. However, the present invention is not limited to this. That is, the client may be configured as an additional device including a component which can receive command information.

Hereinafter, components of the artificial intelligence system will be explained according to an information flow.

The client receives command information from a user.

The command information means information received from a user in order for the artificial intelligence system to perform a specific function. That is, the command information may be understood as a user's control command with respect to the artificial intelligence system.

The command information may be configured in various forms. More specifically, the command information may be configured as voice information, a text, etc. For instance, if the command information is configured as voice information, a user may utter a specific command word such that the artificial intelligence system may perform a specific function.

According to a type of the command information, the client receives the command information by using a different means. For instance, when the command information is voice information, the client receives the command information through a microphone. On the other hand, when the command information is a text, the client receives the command information through a touch screen or a keyboard.

In this specification, it is assumed that the client performs a specific function by receiving voice information. However, the artificial intelligence system according to the present invention may perform a corresponding function by receiving various types of command information.

More specifically, the artificial intelligence system receives command information from a user through the components included in the mobile terminal 100, and determines a specific function to be executed based on the received command information. Then, an agent receives information required to perform the specific function, through the components included in the mobile terminal 100.

After receiving the command information from the user, the client transmits the received command information to a server. The server interprets a meaning of the received command information, and performs a specific function based on the interpreted meaning.

If the server receives command information configured as voice information, the server additionally performs a voice recognition process. More specifically, the server converts the voice information into a text, and interprets a meaning of the converted text.

In the process of converting the voice information into a text and interpreting a meaning of the converted text, machine learning technology may be utilized. Especially, if the machine learning technology is utilized in the process of interpreting a meaning of the converted text, even if command information is formed in a natural language, a meaning of the command information may be analyzed with high accuracy. Thus, a user may apply the command information to the artificial intelligence system in a dialogue manner with a man.

The server may utilize various types of resources when performing a function related to command information. For instance, when the server performs a function related to search for a specific keyword, a plurality of different search engines may be used. As another example, when the server performs a function to order a specific product, the server may access another server which can purchase the specific product. The server performs a function wanted by a user, through an interaction with various types of resources. When the server selects a type of resources required to perform a specific function, machine learning technology may be utilized. That is, the artificial intelligence system according to the present invention may automatically collect information related to a user and learn, thereby selecting a type of resources required to perform a specific function.

After performing the function corresponding to command information, the server transmits response information related to the performed function, to the client. The response information may be a result obtained after performing the function corresponding to the command information, or may be information indicating a performed state of the function. For instance, the response information may be a search result with respect to a specific key word, or may be information indicating that a specific product has been successfully ordered. That is, the response information may be variable according to a function corresponding to command information.

After receiving the response information from the server, the client provides the received response information to a user. In this case, the client may provide the received response information to the user as it is, or may provide the user with a response to the command information by using the received response information.

As the client provides the response to the command information, a feedback with respect to the user's command information is performed. Accordingly, the user may check whether a function with respect to a specific control command has been performed or not.

As aforementioned, the artificial intelligence system autonomously performs a specific function by utilizing machine learning technology. Since the machine learning technology is based on collected data, performance of the artificial intelligence system may be variable according to collected data. For instance, if most of data utilized for the machine learning technology is formed in a specific language, the artificial intelligence system may exhibit a high performance only with respect to the specific language.

As aforementioned, performance of the artificial intelligence system may be variable according to a user's language. In order to solve such a problem, the artificial intelligence system according to the present invention includes a plurality of different servers. Hereinafter, will be explained a method for controlling an artificial intelligence system which performs a multilingual processing using a plurality of servers.

Figure 2:
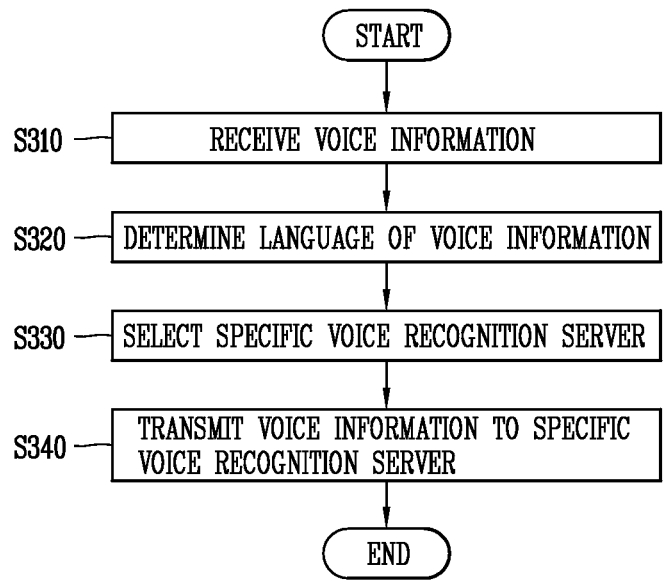
FIG. 2 is a flowchart for explaining a method for controlling an artificial intelligence system which performs a multilingual processing according to the present invention.

FIG. 2 is a flowchart for explaining a method for controlling an artificial intelligence system which performs a multilingual processing according to the present invention. In FIG. 2, a client included in the artificial intelligence system is the mobile terminal 100. However, the present invention is not limited to this.

Referring to FIG. 2, voice information is received through the microphone (S310). The mobile terminal 100 receives a user's voice through the microphone. Here, sound such as surrounding noise or dialogues may be received. For instance, a man's voice output from a television may be received.

In order to distinguish surrounding noise and command information from each other, the mobile terminal 100 recognizes voice information received later as command information only when a voice of a specific keyword is recognized.

Then, a language of the voice information is determined based on a preset reference (S320).

Then, a specific voice recognition server is selected from a plurality of voice recognition servers which process different languages, based on a result of the determination (S330).

Then, the voice information is transmitted to the selected specific voice recognition server (S340).

Hereinafter, a detailed embodiment will be explained.

The determining a language of the voice information (S320) may include determining a language of the voice information by dividing the voice information in unit of phoneme.

The determining a language of the voice information (S320) may include dividing the voice information in unit of phoneme; and if the voice information includes a plurality of phonemes, determining a language of each of the plurality of phonemes.

Then, a specific voice recognition server is selected from a plurality of voice recognition servers which process different languages (S330).

Each of the plurality of voice recognition servers may be specified to a different language. In the present invention, a server specified to a user's language is selected.

In a case where the plurality of phonemes are formed in a plurality of different languages, the selecting a specific voice recognition server may include selecting a voice recognition server different from a voice recognition server which processes each of the plurality of languages.

The control method according to the present invention may further include receiving response information to the voice information from the specific voice recognition server, after transmitting the voice information to the specific voice recognition server; and performing a reply to the voice information based on the response information.

In the present invention, a feedback with respect to the voice information may be provided to a user through the reply.

The control method according to the present invention may further include storing the voice information; receiving new voice information through the microphone after storing the voice information; determining a similarity between the new voice information and the stored voice information; and when the similarity satisfies a preset condition, performing a reply which is the same as a feedback with respect to the voice information.

With such a configuration, a processing speed with respect to a repetitive control command may be reduced.

The control method according to the present invention may further include requesting a language conversion with respect to the voice information to the specific voice recognition server, such that the language of the voice information is converted into a second language from a first language; receiving language conversion data with respect to the voice information, from the specific voice recognition server; and transmitting the language conversion data to a voice recognition server which processes the second language.

With such a configuration, in the present invention, a processing result with respect to one voice information may be received from a plurality of servers, and a reply may be performed.

As aforementioned, the artificial intelligence system which performs a multilingual processing may be implemented in the aforementioned mobile terminal 100, or may be implemented as a fixed terminal or another additional device.

If the artificial intelligence system is implemented as an additional device, the artificial intelligence system may also include the components of the mobile terminal 100 shown in FIG. 1A, i.e., the speaker, the microphone, the display unit, the controller, the artificial intelligence unit, the communication unit, etc.

Hereinafter, a detailed embodiment of the artificial intelligence system which performs a multilingual processing according to the present invention, will be explained with reference to FIGS. 3 to 6.

Figure 3:
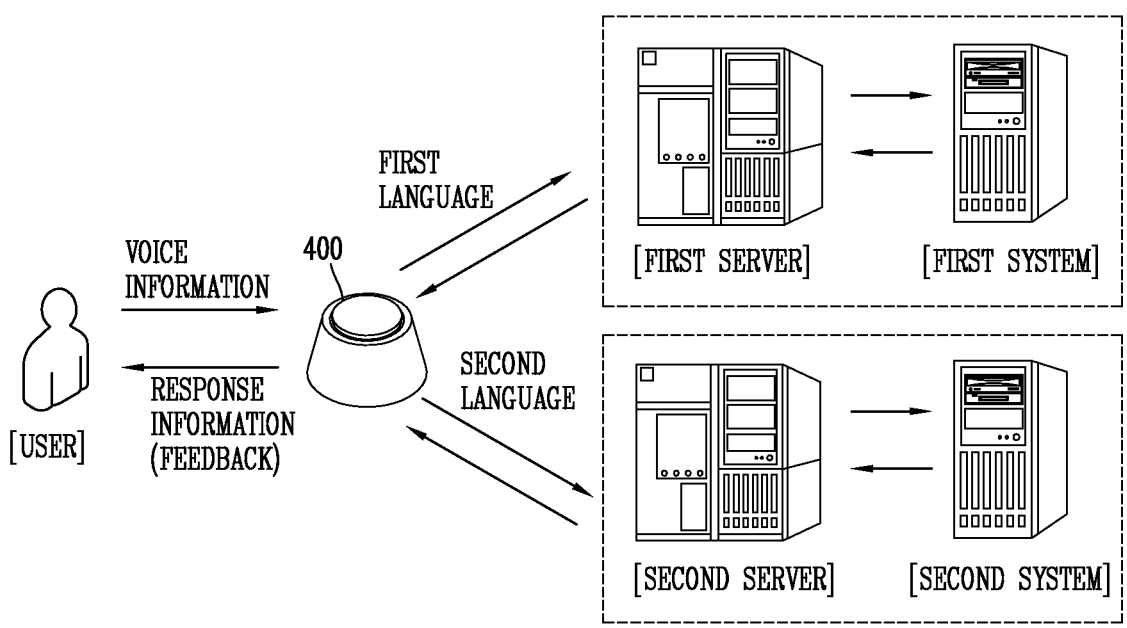
FIG. 3 is a conceptual view for explaining a method for controlling an artificial intelligence system which performs a multilingual processing according to the present invention.

FIG. 3 is a conceptual view for explaining a method for controlling the artificial intelligence system which performs a multilingual processing according to the present invention.

Referring to FIG. 3, once a user inputs voice information through the microphone, the artificial intelligence system 400 according to the present invention may determine a language (a type of a language) of the inputted voice information, based on a preset reference.

More specifically, the voice information, a voice uttered by a user, may be divided into phonemes. The phonemes may be defined as a unit of a minimum sound for discerning a meaning of a word in a voice system of a language.

For instance, the artificial intelligence system 400 may divide inputted voice information in unit of phoneme, and may determine whether the voice information is English, Japanese, Chinese, Korean, or the like.

Then, a specific voice recognition server which processes the determined language may be selected from a plurality of voice recognition servers which process different languages, and the voice information may be transmitted to the selected specific voice recognition server. That is, the voice information is transmitted to a server allocated according to a type of a language.

Each of the plurality of voice recognition servers may be specified to a different language. For instance, a first server has a more excellent performance in Korean than any other languages, and a second server has a more excellent performance in English than any other languages.

In the present invention, voice information is transmitted to a server specified to a language which forms the voice information, among a plurality of servers. This may enhance precision in recognizing a voice.

For instance, if the voice information is determined as Korean, the voice information may be transmitted to the first server which has a more excellent performance in Korean than any other languages. Likewise, if the voice information is determined as English, the voice information may be transmitted to the second server which has a more excellent performance in English than any other languages.

After transmitting the voice information to the specific voice recognition server, the artificial intelligence system 400 may receive response information related to the voice information, from the specific voice recognition server. Then, the artificial intelligence system 400 may perform a reply corresponding to the voice information, based on the response information.

In order to calculate the response information related to the voice information, the specific voice recognition server may exchange data with a specific system. The specific system, specified to a specific server, may be another server, or may be implemented in various forms (e.g., a search engine, etc.) which can calculate response information related to the voice information.

However, the present invention is not limited to this. That is, the specific voice recognition server itself may calculate the response information related to the voice information.

The response information (a reply to the voice information) may be executed in a language of the voice information. For instance, if the voice information is received in a first language, a reply to the voice information may be performed in the first language.

For instance, if the voice information is received in Korean, a reply to the voice information may be output in Korean, through the speaker or the display unit.

In the present invention, since a language used to reply is determined according to a user's mother tongue, users who speak different languages may easily use the artificial intelligence system.

As aforementioned, in the artificial intelligence system according to the present invention, a server which is to perform a multilingual processing according to a user's mother tongue is allocated by the client. This may allow the multilingual processing to be performed rapidly. Further, since voice information is processed by a server specified to a language which forms the voice information, the artificial intelligence system may process any type of language applied thereto with high precision.

Voice information received from a user may include a plurality of different languages. Hereinafter, will be explained a method for processing voice information including a plurality of different languages.

Figure 4:
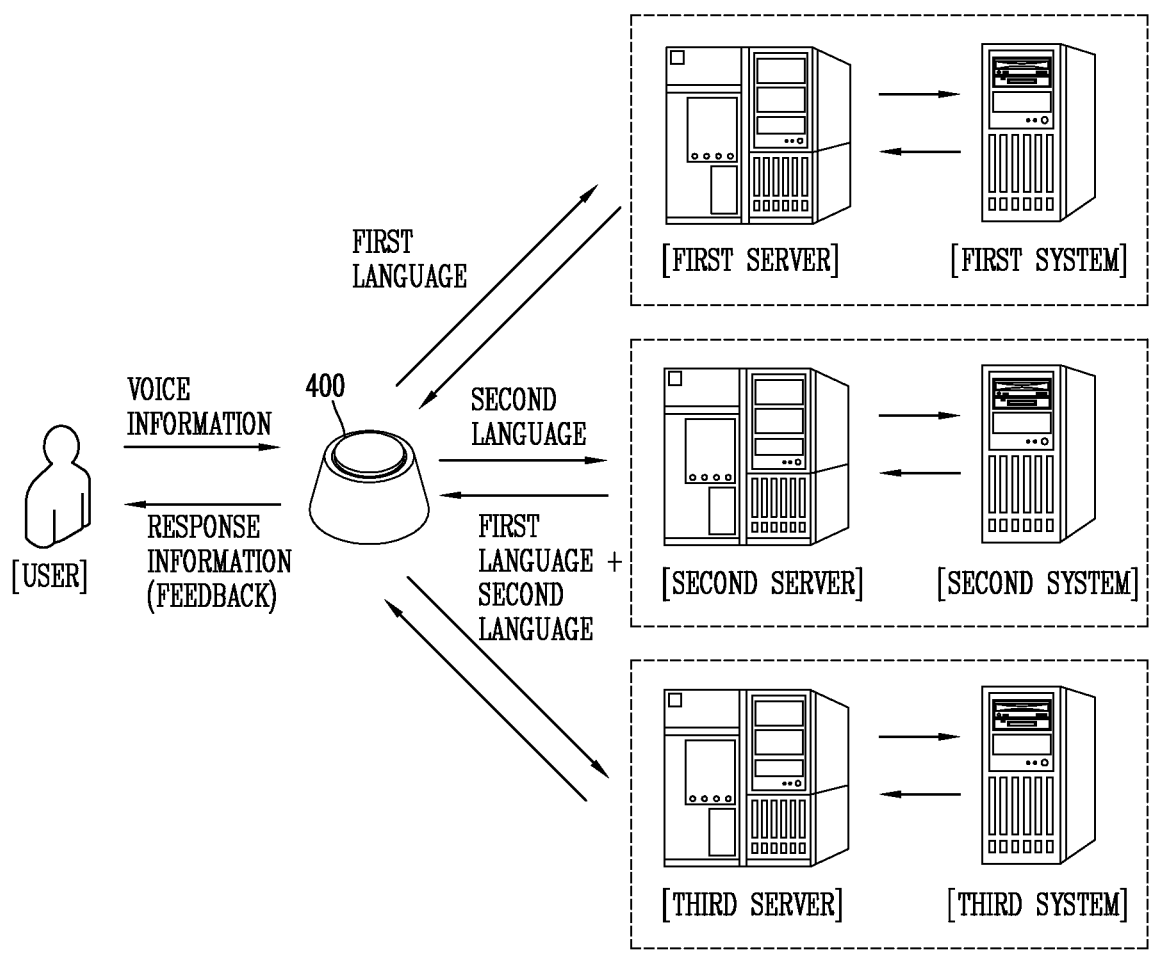
FIG. 4 is a conceptual view for explaining a method for controlling an artificial intelligence system when one voice information includes a plurality of languages.

FIG. 4 is a conceptual view for explaining a method for controlling the artificial intelligence system when one voice information includes a plurality of languages.

Referring to FIG. 4, the artificial intelligence system 400 according to the present invention may divide received voice information in unit of phoneme, and may determine a language of each of a plurality of phonemes if the voice information includes the plurality of phonemes.

In this case, if the plurality of phonemes are formed in a plurality of different languages, may be selected a server specified to a mixed language processing, rather than a voice recognition server which processes each of the plurality of languages.

More specifically, if voice information is formed in a mixed language of a first language and a second language, the voice information is transmitted to a server specified to a mixed language processing, rather than a server specified to the first language and a server specified to the second language.

For instance, if a user utters "Please order coffee", a language of voice information may be determined as English and Korean. In this case, the voice information may be transmitted to a third server specified to a mixed language processing, rather than a first server specified to Korean and a second server specified to English. The server specified to a mixed language processing may be formed through repetitive learnings with respect to voice information where specific languages are mixed with each other. For instance, a server to perform a mixed language processing may be formed through a machine learning with respect to voice information where Korean and English are mixed with each other.

As aforementioned, in the present invention, voice information formed in a mixed language is allocated to a server specified to a mixed language processing, rather than a server specified to a specific language. This may enhance a processing capability with respect to a mixed language.

Then, the artificial intelligence system may receive a reply corresponding to the voice information, from the third server.

Here, the reply corresponding to the voice information may be performed in the first language or the second language, or in a mixed language of the first and second languages.

For instance, in response to the voice information "Please order coffee", a reply may be performed in Korean "Ne" or in English "Yes". Alternatively, a reply may be performed in both of Korean and English (e.g., "You've ordered coffee.").

Here, the reply corresponding to the voice information, which is formed in a plurality of different languages, may be performed in a language which satisfies a preset condition among the plurality of languages. More specifically, the language used to perform the reply may be a language which has a highest using rate in the voice information, among the plurality of languages. The using rate may be calculated based on the number of phonemes formed in a specific language, with respect to a total number of phonemes which constitute the voice information.

For instance, since a using rate of Korean in the voice information ("Please order coffee") is higher than that of English, a language used to perform the reply may be Korean.

With such a configuration, in the present invention, a reply may be performed in a user's desired language, based on a language usage pattern of the user.

So far, has been explained the artificial intelligence system which processes a mixed language. Hereinafter, will be explained a method of shortening a processing time with respect to a repetitive command.

Figure 5:
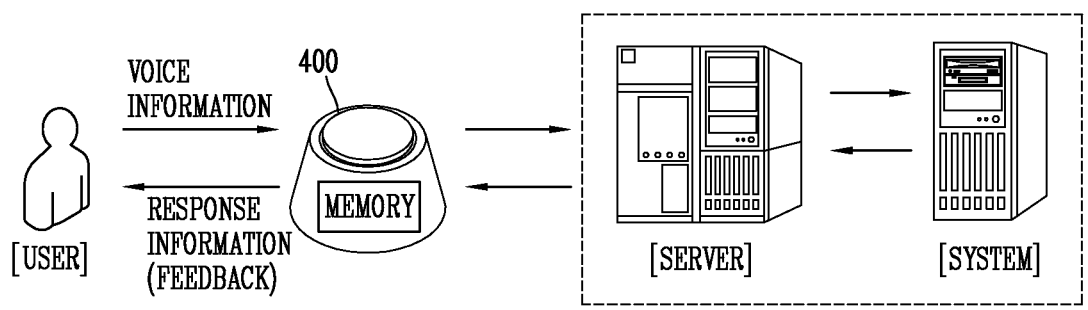
FIG. 5 is a conceptual view for explaining a method for controlling an artificial intelligence system which performs a multilingual processing using a memory.

FIG. 5 is a conceptual view for explaining a method for controlling the artificial intelligence system which performs a multilingual processing using a memory.

Referring to FIG. 5, the artificial intelligence system 400 according to the present invention may store voice information received through the microphone. Then, if new voice information is received through the microphone, the artificial intelligence system 400 may determine a similarity between the new voice information and the stored voice information.

The determination of the similarity is performed by a client (mobile terminal). The client (mobile terminal) may not determine a similarity of voice information by converting the voice information into a text, but may determine a similarity of voice information itself. This may reduce the amount of resources required to determine a similarity of voice information.

If the determined similarity is more than a predetermined level, the artificial intelligence system may perform a reply which is the same as a feedback corresponding to the voice information. That is, the artificial intelligence system may perform a reply corresponding to the voice information, without transmitting the voice information to a specific server.

For instance, as voice information ("Where is the capital of Korea?") is received, the artificial intelligence system may transmit the voice information to a first server which processes voice information inputted in Korean.

As a reply to the voice information is received from the first server, the artificial intelligence system may output response information ("Seoul") in Korean. The voice information ("Where is the capital of Korea?") and the response information ("Seoul") are stored in the memory.

As voice information ("What's the name of the capital of Korea?") is received, the artificial intelligence system 400 may calculate a similarity between the voice information and the stored voice information ("Where is the capital of Korea?").

The client may set a specific word included in voice information repetitively received, as a key word. For instance, in voice information repetitively received ("What's the name of the capital of Korea?"), the client may set "Korea" and "Capital" as key words. Then, if voice information corresponding to the "Korea" and "Capital" is detected from received voice information, the client may determine that the received voice information has a high similarity with the preset voice information.

At the time of setting the key words, the client may utilize response information received from a server. More specifically, the server converts voice information into a text in order to process the voice information. Here, the client may receive the converted text from the server, and may set key words of voice information repetitively received based on the received text.

Then, in order to perform a reply to the voice information ("What's the name of the capital of Korea?"), the artificial intelligence system 400 according to the present invention may obtain response information, without selecting a server or transmitting the voice information.

That is, a reply to voice information having a high similarity with preset voice information is read from the memory to thus be adopted as response information. This may allow a rapid processing to be performed.

So far, has been explained a method for processing voice information repetitively input. Hereinafter, will be explained a method for using a plurality of servers specified to different languages, in order to process voice information.

Each of the plurality of servers performs a function related to voice information, using systems related thereto. In this case, the server's processing capability with respect to the voice information may be variable according to performance of the systems related to the server. As voice information received from a user is transmitted to each of a plurality of servers having different processing capabilities, response information may be received from each of the plurality of servers, and then a reply may be performed based on the received response information. In this case, accuracy in processing the voice information may be enhanced.

However, since the plurality of servers are specified to different languages, if voice information formed in other language rather than the specified languages is received, accuracy in processing the voice information may be lowered. In order to solve such a problem, a language conversion function is utilized in the present invention.

Figure 6:
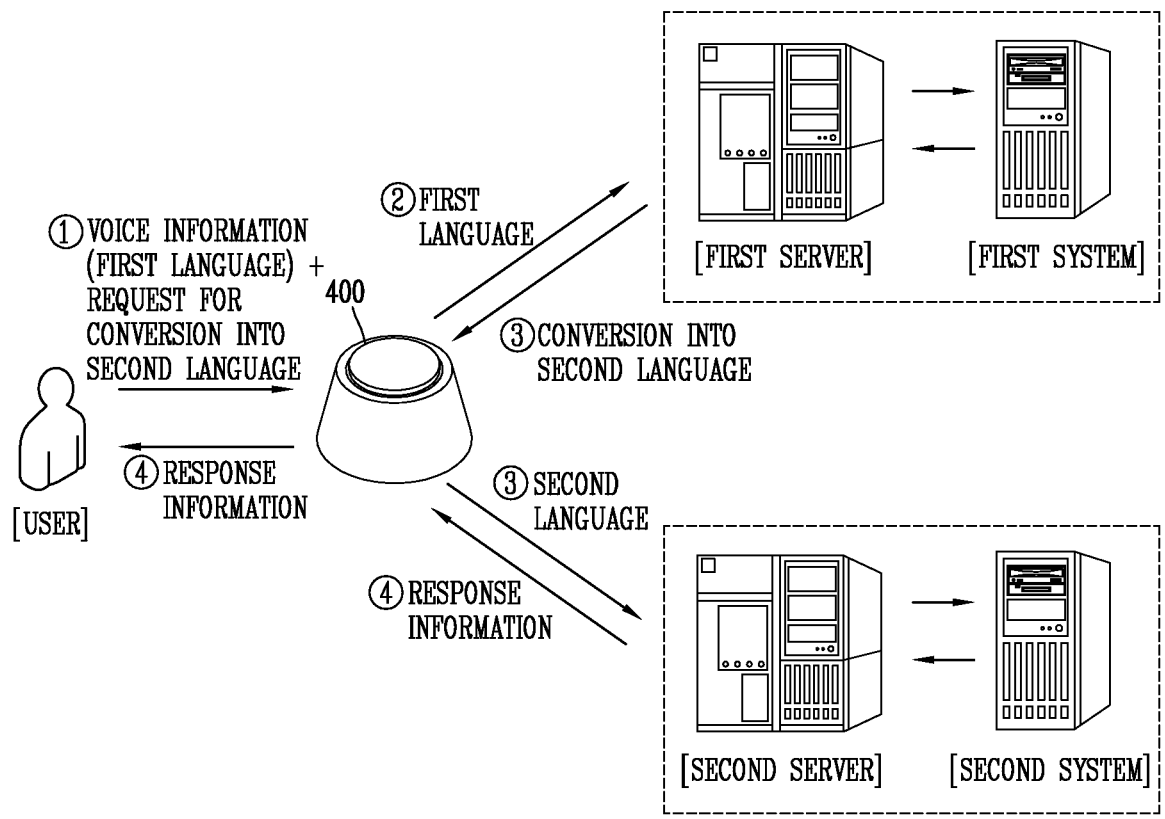
FIG. 6 is a conceptual view for explaining a method for controlling an artificial intelligence system when a language conversion request is additionally input.

FIG. 6 is a conceptual view for explaining a method for controlling the artificial intelligence system when a language conversion request is additionally input.

Referring to FIG. 6, a user may request a language conversion with respect to voice information to a specific voice recognition server which processes a first language, such that a language of the voice information may be converted into a second language from the first language.

As a result, the artificial intelligence system 400 may receive language conversion data with respect to the voice information, from the specific voice recognition server, and may transmit the language conversion data to a voice recognition server which processes the second language.

In an embodiment, a user may input voice information in a first language, and then may input an additional request to convert (translate) the first language into a second language. Thus, the artificial intelligence system 400 may request a language conversion (translation) with respect to the voice information to a first voice recognition server which processes the first language.

Then, the artificial intelligence system 400 may receive data converted into the second language, from the first voice recognition server. Then, the artificial intelligence system 400 may transmit the data to a second voice recognition server which processes the second language.

That is, the user additionally requests for a language conversion (translation) and then receives response information, thereby receiving processing results with respect to one voice information from a plurality of servers. This may allow the user to use a server which has a more excellent performance, a preferred server, etc.

As aforementioned, in at least one of embodiments of the present invention, voice information is transmitted to a different server according to a type (language type) of an uttered voice. As a result, as an optimum server is firstly allocated in a client step, a rapid/precise service may be provided.

According to another embodiment, a user may select a server which is to perform a multilingual processing by inputting a specific request (language conversion request).

The present invention can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the terminal. Therefore, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A method for controlling a multilingual audio processing system, the method comprising:
   receiving voice information via a microphone;
   separating the voice information into a plurality of phonemes to determine the language of the received voice information;
   determining a language of each of the plurality of phonemes;
   determining at least one language of the received voice information based on a preset reference language information;
   selecting a specific voice recognition server from a plurality of voice recognition servers based on the determined at least one language, wherein the plurality of voice recognition servers correspond to different languages and the specific voice recognition server corresponds to the at least one determined language; and
   generating a query comprising the received voice information and transmitting the query to the selected specific voice recognition server,
   wherein:
   the plurality of phonemes is determined to correspond to a plurality of languages;
   the selected specific voice recognition server is configured to process mixed language voice information; and
   the selected specific voice recognition server is configured to process voice information comprising specific mixed languages based on repeated machine learning training using training data comprising voice information with the specific mixed languages.

2. The method of claim 1, wherein the preset reference language information is stored in a memory at a client of the system, and the client determines the at least one language of the received voice information to select the specific voice recognition server.

3. The method of claim 1, wherein the determined at least one language corresponds to a single language, and the selected specific voice recognition server is configured to process only voice information in the single language.

4. The method of claim 1, further comprising:
   receiving a response to the generated query from the specific voice recognition server;
   generating reply information to the received voice information based on the received response; and
   outputting the generated reply in response to the received voice information.

5. The method of claim 4, wherein the outputted generated reply is in the form of an audio output.

6. The method of claim 5, wherein the audio output of the generated reply is performed in the determined language of the received voice information.

7. The method of claim 4, wherein the outputted generated reply is displayed on a display of a client terminal of the system.

8. The method of claim 4, further comprising:
   storing the received voice information in a memory at a client terminal of the system;
   receiving another voice information via the microphone;
   retrieving the stored voice information from the memory;
   generating a similarity value between the another voice information and the retrieved stored voice information; and
   outputting a reply stored in the memory and associated with the stored voice information when the generated similarity value is equal to or greater than a threshold value.

9. The method of claim 4, wherein when the voice information comprises a plurality of different languages, the generated reply to the voice information is in one of the plurality of languages determined to be a preferred language.

10. The method of claim 1, further comprising:
    requesting a language translation with respect to the voice information to the specific voice recognition server for translating the voice information into a second language from a first language;
    receiving language translation data for the voice information from the specific voice recognition server;
    generating reply information to the received voice information based on the received language translation data; and
    outputting the generated reply in response to the received voice information.

11. The method of 10, wherein the outputted generated reply is in the form of an audio output.

12. The method of 10, wherein the outputted generated reply is displayed on a display of a client terminal of the system.

13. A multilingual audio processing terminal, the terminal comprising:
    a microphone configured to receive audio information;
    a transceiver configured to transmit and receive information; and
    a controller configured to:
    receive voice information via the microphone;
    separate the voice information into a plurality of phonemes to determine the language of the received voice information;
    determine a language of each of the plurality of phonemes;

determine at least one language of the received voice information based on a preset reference language information;

select a specific voice recognition server from a plurality of voice recognition servers based on the determined at least one language, wherein the plurality of voice recognition servers correspond to a different languages and the specific voice recognition server corresponds to the at least one determined language; and transmit, via the transceiver, a query comprising the received voice information to the selected specific voice recognition server, wherein:

the plurality of phonemes is determined to correspond to a plurality of languages;

the selected specific voice recognition server is configured to process mixed language voice information; and the selected specific voice recognition server is configured to process voice information comprising specific mixed languages based on repeated machine learning training using training data comprising voice information with the specific mixed languages.

14. The terminal of claim 13, further comprising a memory, wherein:

the preset reference language information is stored in the memory; and the controller is further configured to determine the at least one language of the received voice information to select the specific voice recognition server.

15. The terminal of claim 13, wherein the determined at least one language corresponds to a single language, and the selected specific voice recognition server is configured to process only voice information in the single language.

16. The terminal of claim 13, further comprising an output configured to output information, wherein the controller is further configured to:

receive, via the transceiver, a response to the generated query from the specific voice recognition server;

generate reply information to the received voice information based on the received response; and output, via the output, the generated reply in response to the received voice information.

17. The terminal of claim 16, wherein the output comprises a speaker and the outputted generated reply is in the form of an audio output.

18. The terminal of claim 17, wherein the audio output of the generated reply is performed in the determined language of the received voice information.

19. The terminal of claim 16, wherein the output comprises a display configured to display information and the outputted generated reply is displayed on the display.

20. The terminal of claim 16, further comprising a memory, wherein the controller is further configured to:

store the received voice information in the memory;

receive another voice information via the microphone;

retrieve the stored voice information from the memory;

generate a similarity value between the another voice information and the retrieved stored voice information; and output, via the output, a reply stored in the memory and associated with the stored voice information when the generated similarity value is equal to or greater than a threshold value.

21. The terminal of claim 16, wherein when the voice information comprises a plurality of different languages, the generated reply to the voice information is in one of the plurality of languages determined to be a preferred language.

22. The terminal of claim 13, wherein the controller is further configured to:

transmit, via the transceiver, a request for language translation with respect to the voice information to the specific voice recognition server for translating the voice information into a second language from a first language;

receive, via the transceiver, language translation data for the voice information from the specific voice recognition server;

generate reply information to the received voice information based on the received language translation data; and output, via the output, the generated reply in response to the received voice information.

23. The terminal of claim 22, wherein the output comprises a speaker and the outputted generated reply is in the form of an audio output.

24. The terminal of claim 22, wherein the output comprises a display configured to display information and the outputted generated reply is displayed on the display.

* * * * *